United States Patent
Benkler et al.

(10) Patent No.: US 7,837,224 B2
(45) Date of Patent: Nov. 23, 2010

(54) MOTOR VEHICLE WITH A HEAD-PROTECTION SIDE AIRBAG

(75) Inventors: Olaf Benkler, Neuhausen/Schellbronn (DE); Benno Gayer, Vaihingen/Enz (DE); Klaus Luik, Mühlacker (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 302 days.

(21) Appl. No.: 11/944,698

(22) Filed: Nov. 26, 2007

(65) Prior Publication Data

US 2008/0122266 A1    May 29, 2008

(30) Foreign Application Priority Data

Nov. 24, 2006   (DE) ........................ 10 2006 055 507

(51) Int. Cl.
*B60R 21/213*   (2006.01)
(52) U.S. Cl. .................................. 280/730.2
(58) Field of Classification Search ............. 280/730.1, 280/730.2, 728.3, 728.2; 296/214
See application file for complete search history.

(56) References Cited

U.S. PATENT DOCUMENTS

| | | | | |
|---|---|---|---|---|
| 4,913,484 | A * | 4/1990 | Dowd et al. ............... | 296/97.12 |
| 5,829,817 | A * | 11/1998 | Ge ............................. | 296/97.9 |
| 6,173,990 | B1 * | 1/2001 | Nakajima et al. ......... | 280/730.2 |
| 6,334,626 | B2 * | 1/2002 | Nakajima et al. ......... | 280/730.2 |
| 6,485,048 | B2 * | 11/2002 | Tajima et al. ............. | 280/728.2 |
| 6,719,323 | B2 * | 4/2004 | Kai et al. .................... | 280/731 |
| 6,883,828 | B2 | 4/2005 | Ohki | |
| 7,325,824 | B2 * | 2/2008 | Totani et al. ............. | 280/728.2 |
| 7,497,468 | B2 * | 3/2009 | Choi et al. ................. | 280/740 |
| 2001/0022441 | A1 * | 9/2001 | Nakajima et al. ......... | 280/730.2 |
| 2001/0052693 | A1 | 12/2001 | Mueller | |
| 2003/0094828 | A1 | 5/2003 | Nagamoto | |
| 2004/0012173 | A1 * | 1/2004 | Blake et al. ............... | 280/730.2 |
| 2004/0075250 | A1 * | 4/2004 | Choi ......................... | 280/728.3 |
| 2005/0052001 | A1 | 3/2005 | Totani et al. | |
| 2005/0236818 | A1 | 10/2005 | Hirose | |
| 2006/0082108 | A1 | 4/2006 | Wahara et al. | |
| 2007/0114766 | A1 * | 5/2007 | Hwang ..................... | 280/730.2 |
| 2007/0241540 | A1 * | 10/2007 | Takemura et al. ........ | 280/728.2 |

FOREIGN PATENT DOCUMENTS

| | | |
|---|---|---|
| DE | 102004042533 A1 | 4/2005 |
| EP | 1334879 A1 | 8/2003 |
| EP | 1410957 A1 | 4/2004 |
| EP | 1640222 A1 | 3/2006 |

OTHER PUBLICATIONS

European Search Report, dated Dec. 11, 2007.

* cited by examiner

*Primary Examiner*—Paul N Dickson
*Assistant Examiner*—Karen Jane J Amores

(57) ABSTRACT

A motor vehicle has a head-protecting side airbag disposed in a region of a lateral roof strut. The airbag is covered by a panel which can be pierced by the side airbag when the need arises. The panel merges laterally into a headliner which covers the vehicle roof on the inside facing the passenger compartment. It is essential for the invention that at least one fastening assembly is provided which is arranged at the transition of the panel to the headliner and fixes both the panel and the headliner to the roof strut.

10 Claims, 3 Drawing Sheets

MOTOR VEHICLE WITH A HEAD-PROTECTION SIDE AIRBAG

CROSS-REFERENCE TO RELATED APPLICATION

This application claims the priority, under 35 U.S.C. §119, of German application DE 10 2006 055 507.4, filed Nov. 24, 2006; the prior application is herewith incorporated by reference in its entirety.

BACKGROUND OF THE INVENTION

Field of the Invention

The present invention relates to a motor vehicle with a head-protection side airbag disposed in a region of a lateral roof strut. The airbag is covered by a panel which can be pierced by the side airbag when the need arises. The panel merges laterally into a headliner which covers the vehicle roof on the inside facing the passenger compartment.

U.S. Pat. No. 6,883,828 B2 and its counterpart European patent EP 1 334 879 B1 disclose a motor vehicle of the type in question, the panel on the roof strut merging laterally into a headliner which covers the vehicle roof on the inside facing the passenger compartment. In this case, the head-protecting side airbag, when triggered, is to expand through a predefined gap into the passenger compartment.

In particular in the case of head-protecting side airbags—also known under the term "window bag"—the problem arises that, in particular in the case of a shell-like headliner, the latter, in the event of the window bag being triggered, is neither to be damaged nor become detached from the roof frame and drop onto the individual sitting in the passenger compartment. Accordingly, the window bag has to be designed in such a manner that its triggering does not have any effect on the motor vehicle headliner.

BRIEF SUMMARY OF THE INVENTION

It is accordingly an object of the invention to provide a motor vehicle with a head-protection airbag which overcomes the above-mentioned disadvantages of the heretofore-known devices and methods of this general type and which provides for an improved, or at least a different embodiment, which is distinguished, in particular, by a headliner which, in its position fixed to the roof frame, is not adversely affected by the side airbag being triggered.

With the foregoing and other objects in view there is provided, in accordance with the invention, a motor vehicle, comprising:

a vehicle roof and a headliner covering said roof facing a passenger compartment;

a head-protecting side airbag disposed in a region of a lateral roof strut;

a panel covering said side airbag and configured to be pierced by said side airbag when the need arises;

said panel merging laterally into said headliner and defining a transition region therebetween; and at least one fastening assembly disposed at said transition region between said panel and said headliner, said fastening assembly fastening said panel and said headliner to said roof strut.

The present invention is based on the general concept of fastening a headliner, i.e., a roof liner, or a panel covering a side airbag to a roof strut of a vehicle body in the region of the side airbag such that the side airbag, in the event of being triggered, can pierce the panel and can be deployed into the passenger compartment without, however, detaching the roof lining from a roof structure and thereby allowing it to drop, for example, onto the passenger sitting in the passenger compartment. The side airbag is a head-protecting airbag, also called a "window bag," which is arranged in the region of the lateral roof strut and is covered by the panel. The panel merges here laterally into the headliner which in a known manner covers the vehicle roof on the inside facing the passenger compartment. According to the invention, a fastening assembly is provided in the transition region between the panel and the headliner, said fastening assembly firstly fastening the headliner and secondly fastening the panel to the roof strut, and therefore a triggering of the side airbag does not have any effect on the fastening of the headliner to the roof strut. A fastening assembly of this type is highly advantageous in particular in vehicles which in this region do not have a grab handle which is otherwise customarily arranged there. Furthermore, a fastening assembly of this type is imperative for vehicles in which, for example, at least the headliner is formed from a stiff shell and therefore the latter, if the fastening assembly were absent, would drop, in the event of the side airbag being triggered, onto the passenger sitting in the passenger compartment. According to the invention, the fastening assembly is designed and arranged in such a manner that it firstly ensures reliable fixing of the headliner to the roof strut and therefore to the vehicle roof, but secondly in no way prevents the side airbag from being deployed if the need arises.

In an advantageous development of the solution according to the invention, the fastening assembly has a support arrangement which surrounds a respective edge region of the panel and of the headliner in a U-shaped manner. A support arrangement of this type ensures reliable securing of the respective edge region on the support arrangement and, as a result, via the support arrangement, which is part of the fastening assembly, the fastening to the roof strut. It is of particular advantage in this case that a support arrangement designed in such a manner surrounds or embraces the particular edge region, as a result of which, in comparison to other fastening variants, a loosening of the fastening, as seen over the long term, caused by the respective edge regions fraying, can very substantially be avoided. The support arrangement according to the invention therefore constitutes a guarantee of a long-term and reliable fastening of the panel and of the headliner to the roof structure.

In a further advantageous embodiment of the solution according to the invention, the support arrangement has at least two supports which are designed in a manner such that they can be latched to each other. Under some circumstances, latching elements, in particular, simplify installation and thereby reduce the manufacturing time and, in particular, the manufacturing costs. Latching connections of this type nevertheless provide reliable fastening of the two supports to each other which, when the need arises, can also be separated from each other again without destruction by being unlatched. Latching connections of this type, for example with latching lugs which engage in corresponding latching openings and latch therein, can nowadays be produced in a simple and cost-effective manner and in virtually any desired embodiment such that, when the need arises, they could also be changed or adapted without a large structural outlay, which has a particularly advantageous effect on the manufacturing processes which are nowadays highly flexible.

At least one of the supports is expediently formed in a complementary manner to an edge contour of the panel and/or of the headliner, which edge contour faces the fastening assembly. In particular, a sheet like bearing of the support against that edge contour of the panel and/or of the headliner which faces it is in mind here, as a result of which, in addition to a purely frictional connection, an interlocking connection between the support and the associated edge region can also be obtained, thus enabling the quality of the connection between the support and the panel and/or the headliner and thereby also the quality of the fastening of the two components to the roof strut to be increased.

It will be understood that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in motor vehicle with a head-protecting side airbag, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
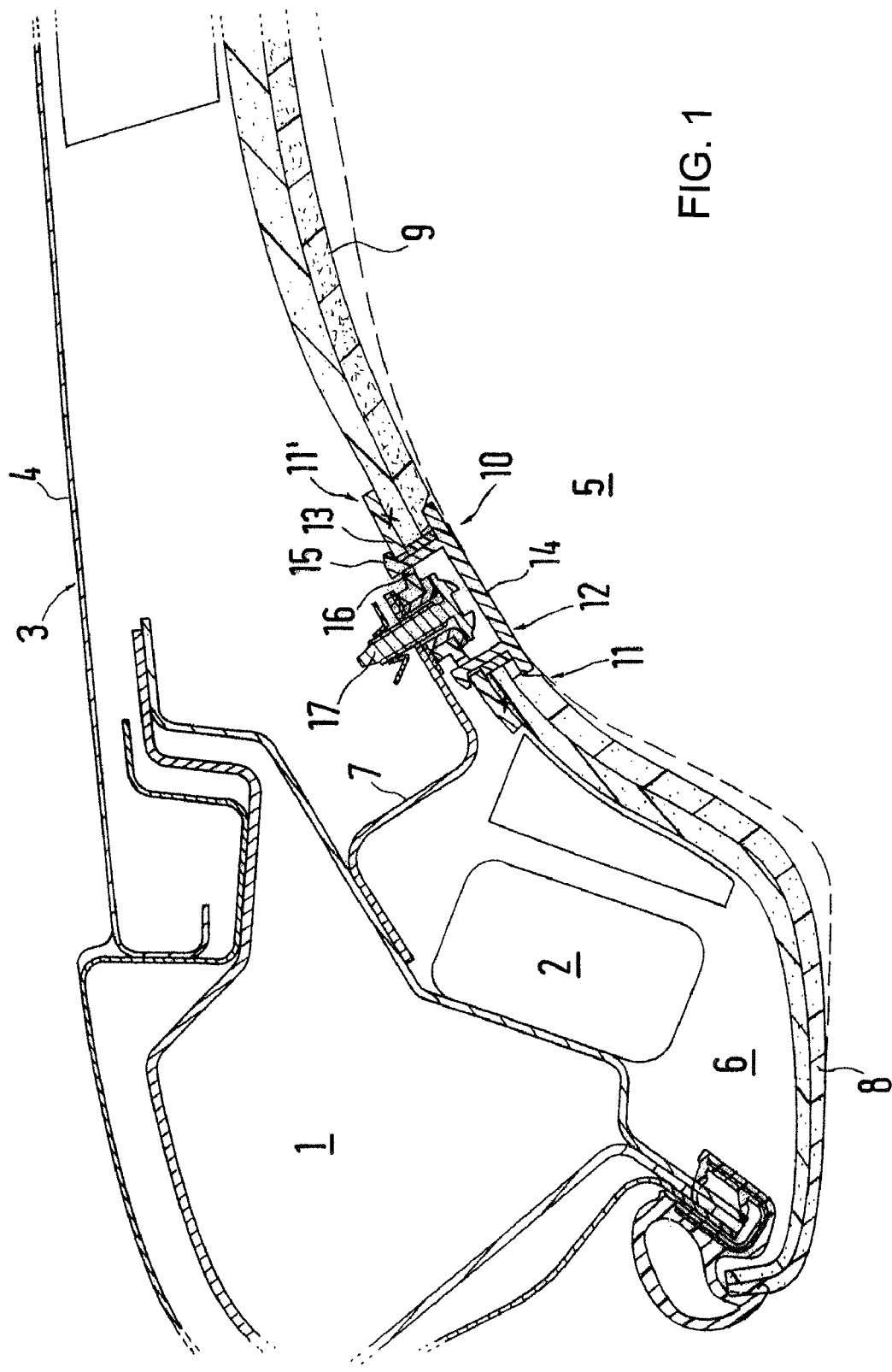
FIG. 1 is a sectional view taken in the region of a lateral roof strut with a fastening assembly according to the invention for fastening a panel, which covers a head-protecting side airbag, and a headliner to the roof strut.

Referring now to the figures of the drawing in detail, a head-protecting side airbag 2, customarily also called a "window bag," is disposed in the region of a lateral roof strut 1. The roof strut 1 runs here at the side of a vehicle roof 3 in the longitudinal direction of the vehicle. The longitudinal direction of the vehicle according to FIGS. 1 to 3 runs perpendicularly to the image plane. The roof strut 1 serves to stiffen the vehicle roof and to laterally fasten a roof shell 4 which extends between the two lateral roof struts 1 of the vehicle. Only one of the two roof struts 1 is illustrated in FIGS. 1 to 3.

Figure 2:
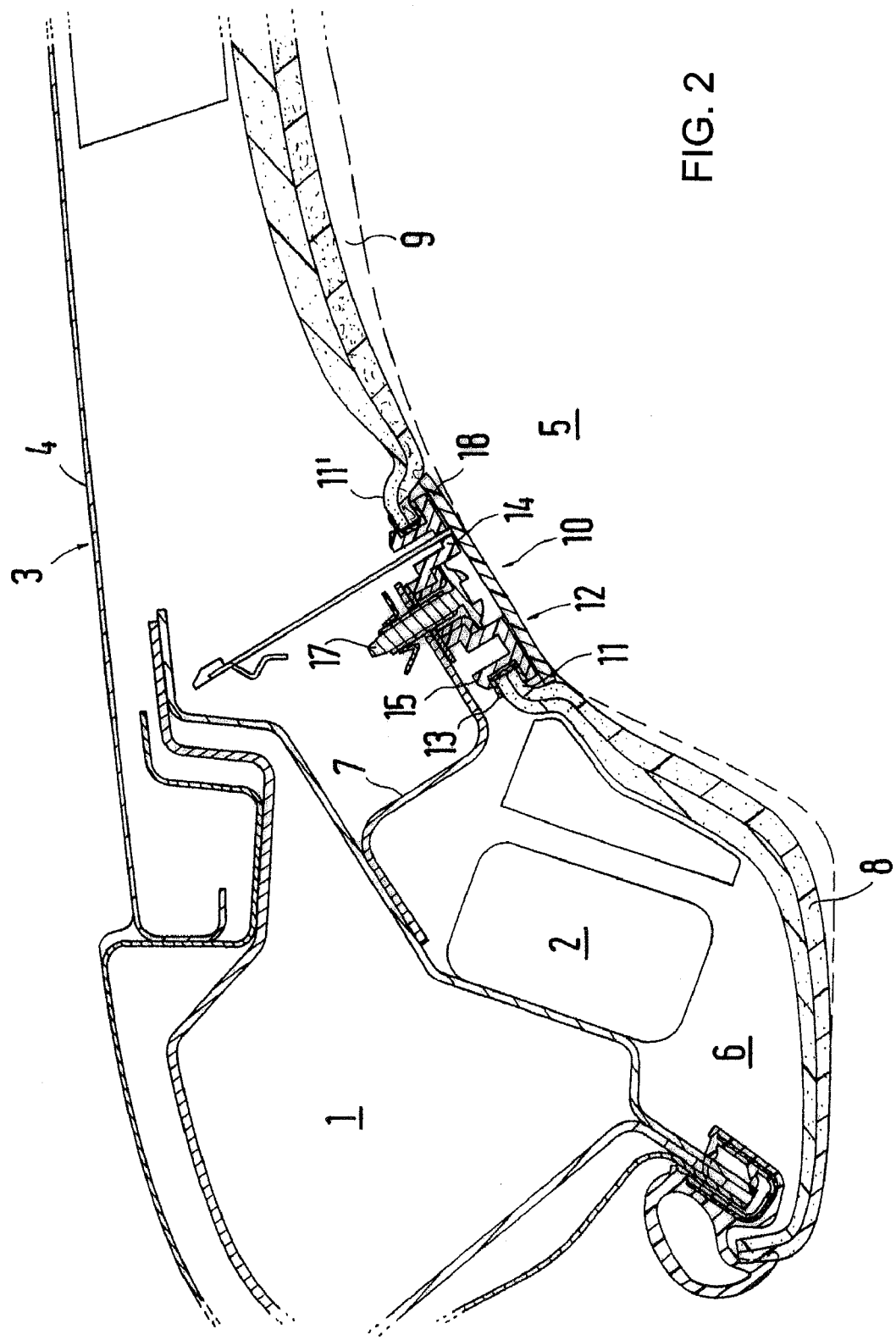
FIG. 2 is an illustration, similar to FIG. 1, but with a different fastening assembly.
Figure 3:
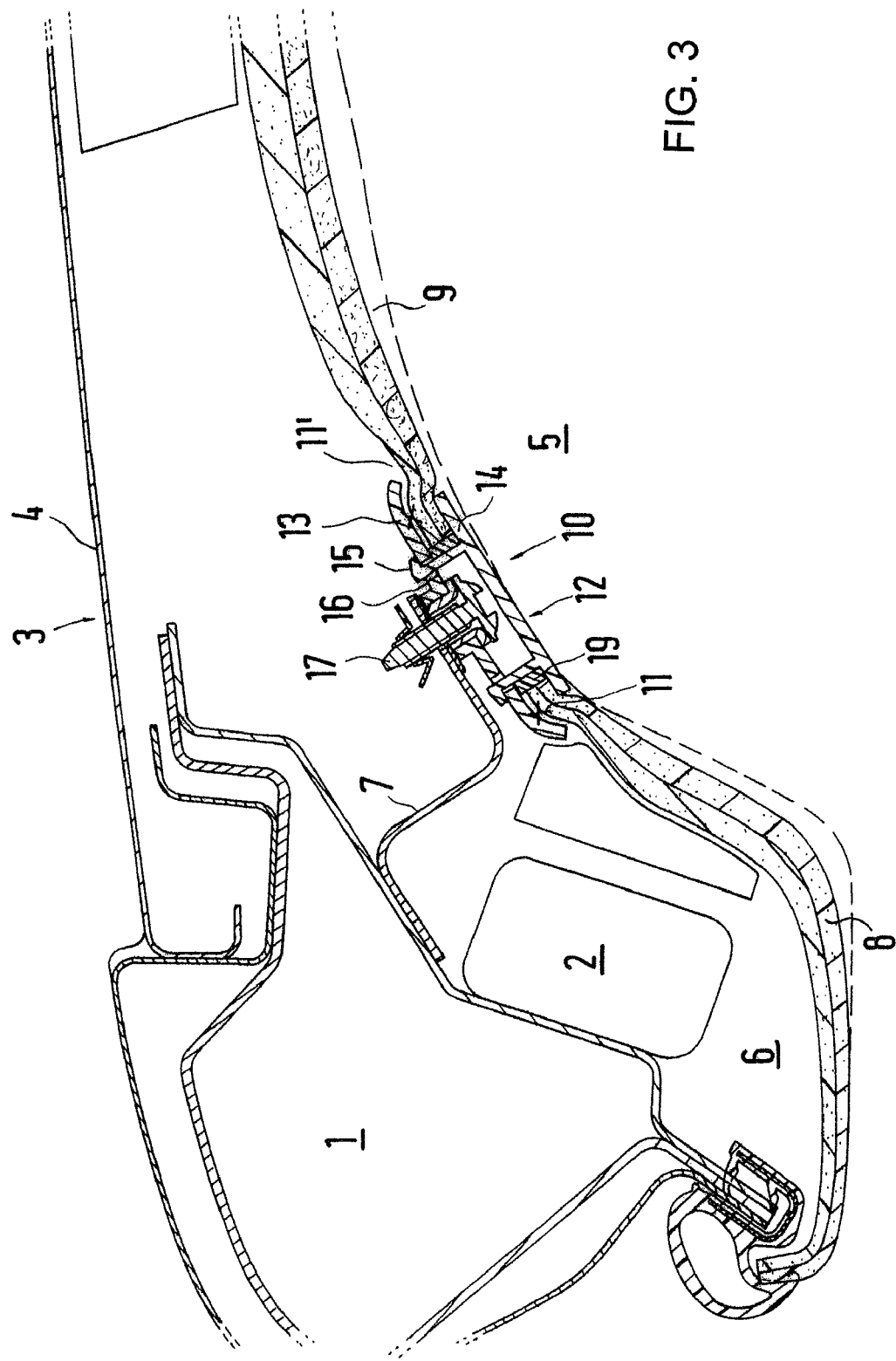
FIG. 3 is a similar view showing the assembly with a further fastening assembly.

According to FIGS. 1 to 3, the side airbag is fastened to the roof strut 1 and is supported thereon such that, in the event of the side airbag 2 being triggered, the roof strut 1 forms an abutment for it. In the event of being triggered, i.e., for example, in the case of a side impact or if the motor vehicle overturns, the side airbag 2 inflates in a known manner in fractions of a second and, when fully inflated, extends into a passenger compartment 5 where, when inflated, it is to avoid or at least dampen direct contact between vehicle body parts and a head of a passenger sitting in the passenger compartment 5. According to FIGS. 1 to 3, the side airbag 2 is shown in a non-triggered state, in which it is arranged hidden from view in a cavity 6. The cavity 6 is bounded firstly by the roof strut 1 or by a holder 7 fastened to the roof strut 1 and secondly by a panel 8 which covers the side airbag 2, as seen from the passenger compartment 5. The panel 8 is designed in such a manner that it can be pierced by the side airbag 2 when the need arises such that said airbag can extend into the passenger compartment 5. The pierceability can be formed, for example, via a predetermined breaking point in the form of a material weakening. In the direction toward the vehicle center, the panel 8 merges into a headliner 9, or roof lining 9, which covers the vehicle roof 3 on the inside facing the passenger compartment 5. The headliner, or roof lining, can be designed here in a customary manner, in particular as a shell element arranged between the lateral panels 8. It is also conceivable for the panel 8 to form part of the headliner 9.

So that the headliner 9 remains in its original fitted position when the side airbag 2 is triggered, at least one fastening assembly 10 is provided which is arranged at the transition of the panel 8 to the headliner 9 and fixes both the panel 8 and the headliner 9 to the roof strut 1. In this case, the fastening assembly 10 according to FIGS. 1 to 3 brings about a fastening of the panel 8 and of the headliner 9 to the roof strut 1 indirectly via the holder 7, with it being conceivable for the holder 7 to be designed as a deformation element and thereby to permit a certain relative movement between the roof strut 1 and the headliner 9 and/or the panel 8 in the event of deformation. The deformability of the holder 7 designed as a deformation element is brought about according to FIGS. 1 to 3 by its substantially S-shaped profile. It is conceivable in this case that the holder 7 is part of the fastening assembly 10.

A common feature of all of the embodiments is that the fastening assembly 10 has a support arrangement 12 which surrounds a respective edge region 11, 11' of the panel 8 and of the headliner 9 in a U-shaped manner. The U-shaped surrounding of the respective edge region 11, 11' protects the edge regions 11, 11' against wearing out or fraying, and ensures that the headliner 9 and the panel 8 are reliably and securely held on the fastening assembly 10. The U-shaped surrounding of the respective edge regions 11, 11' is brought about by two supports 13 and 14 which are part of the support arrangement 12.

In the case of the variant of the support arrangement 12 that is illustrated according to FIG. 1, a first support 13 is designed as a plate and a second support 14 as a cover which can be latched to the first support 13. The two supports 13 and 14 are latched together via latching lugs 15 which, according to FIG. 1, are arranged, for example, on the second support 14 and engage in associated latching openings 16 on the first support 13 or latch thereto. Furthermore, the fastening assembly 10 has a fixing element 17, here a screw, which, according to FIG. 1, fixes the first support 13 on the holder 7. For simplified installation, the first support 13 can be connected fixedly, in particular adhesively bonded, to a side of the headliner 9 that faces the roof shell 4. In order, furthermore, to be able to satisfy, from the passenger compartment 5, a high aesthetic requirement, the second support 14 is preferably designed at the same time as a facing element which firstly forms a facing on the fixing element 17 and secondly creates a smooth, harmonic transition between the panel 8 and the headliner 9.

In order to be able to increase the embracing action of the two supports 13 and 14 with regard to the edge regions 11, 11', at least one of the two supports 13, 14 can be formed in a complementary manner to an edge contour of the panel 8 and/or of the headliner 9, which edge contour faces the fastening assembly 10, as a result of which the respective edge region 11, 11' can be embraced in an interlocking manner. A type of clamping action which is exerted by the second support 14 on a side of the headliner 9 that faces the passenger compartment 5, if the second support 14 is latched to the first support 13, is also conceivable.

A very similar construction to the one shown in FIG. 1 is also illustrated in FIG. 2 where the first support 13 is of U-shaped design and surrounds the edge region 11 of the panel 8 and the edge region 11' of the headliner 9 in a U-shaped manner. The second support 14 of the support arrangement 12 is again latched to the first support 13, with the second support 14 being fixed here to the holder 7. The first support 13 can be of annular design or designed as an essentially straight rail, thus resulting in a punctiform or linear fastening assembly 10. Also in the case of the embodiment according to FIG. 2, the high aesthetic requirement with regard to a view from the passenger compartment 5 of the fastening assembly 10 is achieved by the support 14 being designed as a facing element or supporting a facing shell 18. The latter can either be formed integrally with the support 14 or separately from the latter.

In the case of the embodiment according to FIG. 3, the first support 13 is again fixed to the holder 7 via the fixing element 17, with the second support 14 being latched via corresponding latching lugs 15 to latching openings 16 in the first support 13 and thereby being reliably fixed thereon. In contrast to the support arrangements 12 shown in FIGS. 1 and 2, in the case of the support arrangement 12 according to FIG. 3 a spacer element 19 which delimits the distance between the two supports 13 and 14 is arranged between the two supports 13 and 14. The spacer element 19 may, in particular, be of annular design. As in the case of the fastening assemblies 10 shown in FIGS. 1 and 2, also in the case of the fastening assembly 10 according to FIG. 3 the first support 13 is connected fixedly, in particular is adhesively bonded, to a side of the headliner 9 and the panel 8 that faces the roof shell 4. A common feature of all of the variants is that they can be used relatively simply, permit high positioning accuracy and can be used reliably, with the variant according to FIG. 1 additionally being distinguished by particularly good introduction of force. In addition, in particular the fastening assemblies 10 of FIGS. 1 and 3 can be produced as single-part and thereby cost-effective variants.

The invention claimed is:

1. A motor vehicle, comprising:
    a vehicle roof and a headliner covering said roof facing a passenger compartment;
    a head-protecting side airbag disposed in a region of a lateral roof strut;
    a panel covering said side airbag and configured to be pierced by said side airbag when the need arises;
    said panel merging laterally into said headliner and defining a transition region therebetween; and
    at least one fastening assembly disposed at said transition region between said panel and said headliner, said fastening assembly fastening said panel and said headliner to said roof strut;
    said fastening assembly including a support arrangement surrounding an edge of said panel and an edge of said headliner in a respective U-shape, said support arrangement including a first support fixedly mounted to said roof strut and a second support latched to said first support.

2. The motor vehicle according to claim 1, wherein said fastening assembly includes a holder formed as a deformation element and connected to said roof strut.

3. The motor vehicle according to claim 1, wherein said fastening assembly further includes a holder formed as a deformation element and connected to said roof strut, and said fastening assembly includes a fixing element fixing said first support to said holder.

4. The motor vehicle according to claim 3, wherein said fixing element is a screw.

5. The motor vehicle according to claim 3, wherein said two supports of said support arrangement are configured for latching to one another.

6. The motor vehicle according to claim 3, wherein said second support is a facing element facing the passenger compartment.

7. The motor vehicle according to claim 3, wherein one of said supports includes a facing element facing the passenger compartment.

8. The motor vehicle according to claim 3, wherein at least one of said supports is complementary to an edge contour of said panel and/or of said headliner, said edge contour facing said fastening assembly.

9. The motor vehicle according to claim 3, which comprises a spacer element disposed between said two supports of said support arrangement.

10. The motor vehicle according to claim 9, wherein said spacer element is an annular spacer.

* * * * *